United States Patent [19]

Zdunek et al.

[11] Patent Number: 4,870,408

[45] Date of Patent: Sep. 26, 1989

[54] METHOD FOR DYNAMICALLY ALLOCATING DATA CHANNELS ON A TRUNKED COMMUNICATION SYSTEM

[75] Inventors: Kenneth J. Zdunek, Schaumburg; Garry C. Hess, Hanover Park; Richard A. Comroe, Dundee, all of Ill.

[73] Assignee: Motorola, Inc., Schaumburg, Ill.

[21] Appl. No.: 44,525

[22] Filed: Apr. 30, 1987

[51] Int. Cl.⁴ .................. H04B 7/14; H04Q 11/00
[52] U.S. Cl. .................. 340/825.030; 370/95.1; 455/34
[58] Field of Search .......... 340/825.030, 825.01; 370/95, 17; 455/17, 33, 34, 54, 56, 62

[56] References Cited

U.S. PATENT DOCUMENTS

| | | | |
|---|---|---|---|
| 4,012,597 | 3/1977 | Lynk, Jr. et al. | 455/53 |
| 4,197,500 | 4/1980 | Klein et al. | 455/62 |
| 4,352,183 | 9/1982 | Davis et al. | 371/33 |
| 4,551,852 | 11/1985 | Gravel et al. | 455/33 |
| 4,553,262 | 11/1985 | Coe | 455/15 |
| 4,556,972 | 12/1985 | Chan et al. | 370/94 |
| 4,573,206 | 2/1986 | Grauel et al. | 455/33 |
| 4,574,163 | 3/1986 | Zato | 379/62 |
| 4,578,815 | 3/1986 | Persinotti | 455/33 |
| 4,593,389 | 6/1986 | Wurzburg et al. | 370/110.1 |
| 4,609,778 | 9/1986 | Franklin et al. | 379/243 |
| 4,679,187 | 7/1987 | Irvin | 370/17 |
| 4,698,805 | 10/1987 | Sasuta et al. | 455/17 |
| 4,707,832 | 11/1987 | Glenn et al. | 370/124 |

Primary Examiner—Donald J. Yusko
Assistant Examiner—Edwin C. Holloway, III
Attorney, Agent, or Firm—Wayne J. Egan; Thomas G. Berry

[57] ABSTRACT

Disclosed is a method to dynamically allocate a number of data channels on a trunked radio system (100). The data activity is monitored during a predetermined time interval. If activity is above a predetermined maximum, an additional channel may be reserved for data use. Conversely, if data traffic is low, a data channel may be reallocated for voice message use. Moreover, should the amount of data traffic among the available data channels be unbalanced, the present method contemplates reassigning subscriber units (114 or 116) to the available data channels to balance the data traffic load, thereby providing superior access time and system performance.

14 Claims, 6 Drawing Sheets

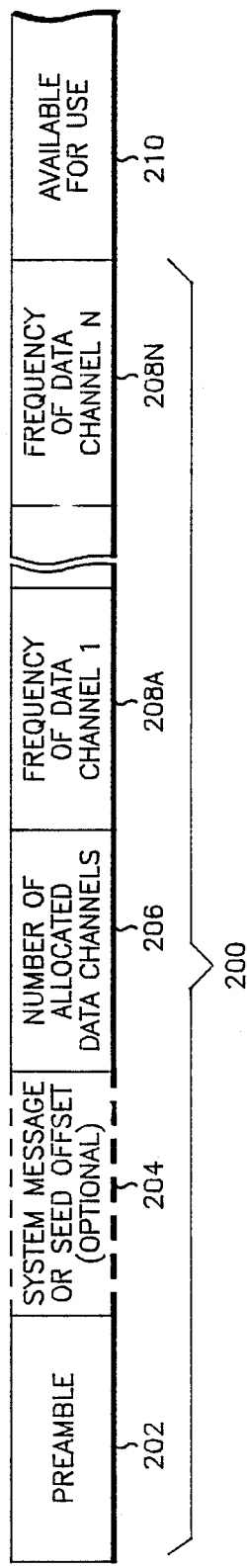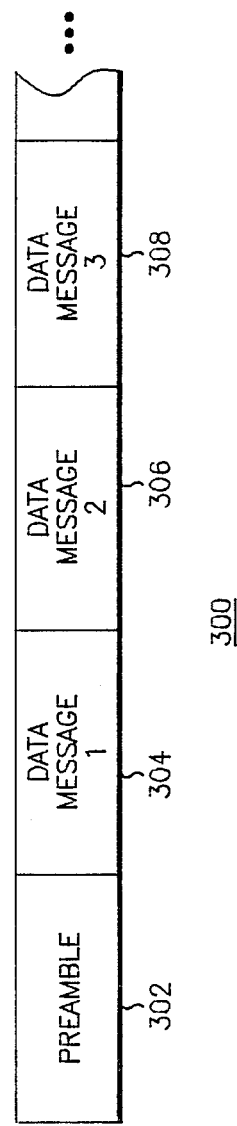

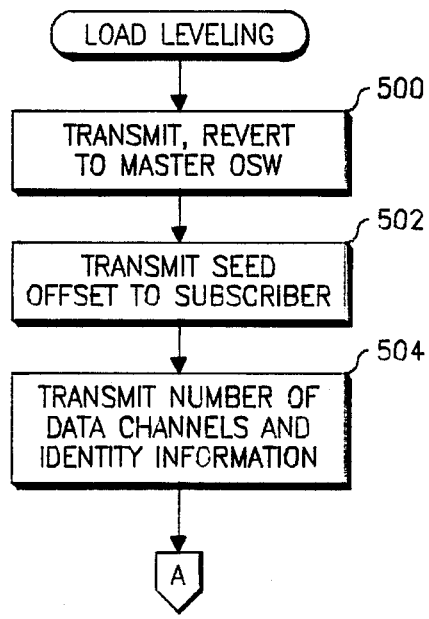
*FIG.5A*
*FIG.5B*
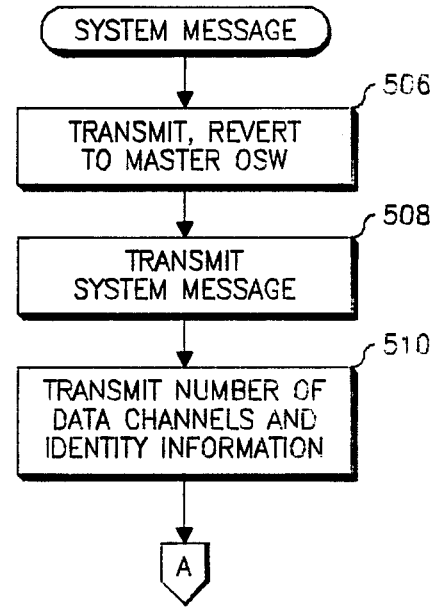

METHOD FOR DYNAMICALLY ALLOCATING DATA CHANNELS ON A TRUNKED COMMUNICATION SYSTEM

TECHNICAL FIELD

This invention relates generally to trunked communications systems and more particularly to trunked communication systems that transceive both voice and data.

BACKGROUND ART

In a basic RF trunked system there exists a high degree of flexibility to partition voice conversations between different groups so that no one group of users is specifically aware when another group of users makes use of the system. Typically, these groups are subdivided into subgroups so that calls may be made upon either a group, subgroup or individual basis depending upon the type of communication desired by an initiating subscriber.

To establish a voice communication between a group of units operating on a trunked system, a subscriber unit transmits a data packet called an "inbound signalling word" (ISW) on a control channel that is maintained for such purposes. The ISW contains at least the requesting unit's unique ID code, which may contain or be used to obtain the requesting subscriber's current talk-group. The request is forwarded to a central controller, which decodes the request, and transmits on the control channel a data pocket called an "outbound signalling word" (OSW) to all subscriber units, which continuously monitor the control channel when not participating in a voice conversation. The OSW is a channel grant which contains the talk-group code of the requesting unit, and the voice channel number assigned for the conversation. The OSW causes the requesting unit to move to the voice channel and commence transmitting, while simultaneously causing all other subscriber units in the same talk-group to move to the voice channel as listening units. In this way a group call is set up. If, however, all voice channels are in use when a subscriber unit transmits an ISW, the central controller typically sends the requesting subscriber a "busy OSW".

In addition to voice messages, it is desirable to send data information across a trunked radio channel. In some data systems, a subscriber unit obtains a trunked data communication channel via the same procedure used to obtain a voice channel. However, this practice is inefficient and spectrally wasteful, due to the time it takes for a requesting subscriber to transmit an ISW and receive a channel grant OSW from the central, and the time it takes to set-up and clear-down the call on the voice channel. At contemporary data transmission rates, it is anticipated that an entire typical data message would take substantially less time to transmit than the time required to obtain a channel (approximately 0.5 seconds). Thus, assigning a data channel pursuant to the same procedure as assigning a voice channel would be wasteful of spectrum and consume precious system time that could be better used to transmit data messages.

Other trunked communication systems desirous to accommodate data traffic have permanently dedicated one or more channels to handling data traffic. While this avoids the access time problem noted above, this technique is contrary to the basic principles of trunked communication systems, which strive to allocate channel resources across a plurality of users as required. Therefore, the practice of having dedicated data channels, permanently removed from the channel allocation "pool" of frequencies, is wasteful of spectral resources and leads to inefficient system operation. Moreover, the dedicated data channel systems lack the capacity to dynamically redistribute or allocate the data traffic load across the available data channels. Such systems typically permanently assign a subscriber unit to a data channel thereby building in future problems as the number of data subscribers increases on a particular channel.

Accordingly, there exists a need for a trunked communication system that can accommodate both voice and data signals, and that operates in true trunked manner to efficiently utilize spectral resources.

SUMMARY OF THE INVENTION

Accordingly, it is an object of the present invention to provide an improved trunked communication system.

It is another object of the present invention to provide a procedure to dynamically allocate data channels on a trunked radio system.

It is a further object of the present invention to redistribute or balance the data traffic load on the particular number of data channels currently available.

It is another object of the present invention to provide a rapid and convenient method to broadcast system wide data messages to all data subscribers.

Accordingly, these and other objects are achieved by the present invention's dynamic allocation of data channels in a trunked radio system.

Briefly, according to the invention, a method is disclosed to dynamically allocate a number of data channels on a trunked radio system. The data activity is monitored during a predetermined time interval. If activity is above a predetermined maximum, an additional channel is reserved for data use. Conversely, if data traffic is low, a data channel is reallocated for voice message use. Moreover, should the amount of data traffic between the available data channels be unbalanced, the present invention contemplates reassigning subscriber units to the available data channels to balance the data traffic load, thereby providing superior access time and system performance.

BRIEF DESCRIPTION OF THE DRAWINGS

The features of the present invention which are believed to be novel are set forth with particularlity in the appended claims. The invention, together with further objects and advantages thereof, may be understood by reference to the following description, taken in conjunction with the accompanying drawings, and the several figures of which like referenced numerals identify like elements, and in which:

FIG. 2 is an illustration of the preferred signalling format for a master data channel;

FIG. 3 is an illustration of the preferred signalling format for other data channels;

FIG. 5a is a flow diagram illustrating the steps executed by the fixed-end equipment of FIG. 1 to perform the load leveling of subscriber units to available data channels in accordance with the present invention;

FIG. 5b, is a flow diagram of the steps executed by the fixed-end equipment of FIG. 1 to transmit a system message to the subscriber units in accordance with the present invention.

DETAILED DESCRIPTION OF THE PREFERRED EMBODIMENT

Figure 1:
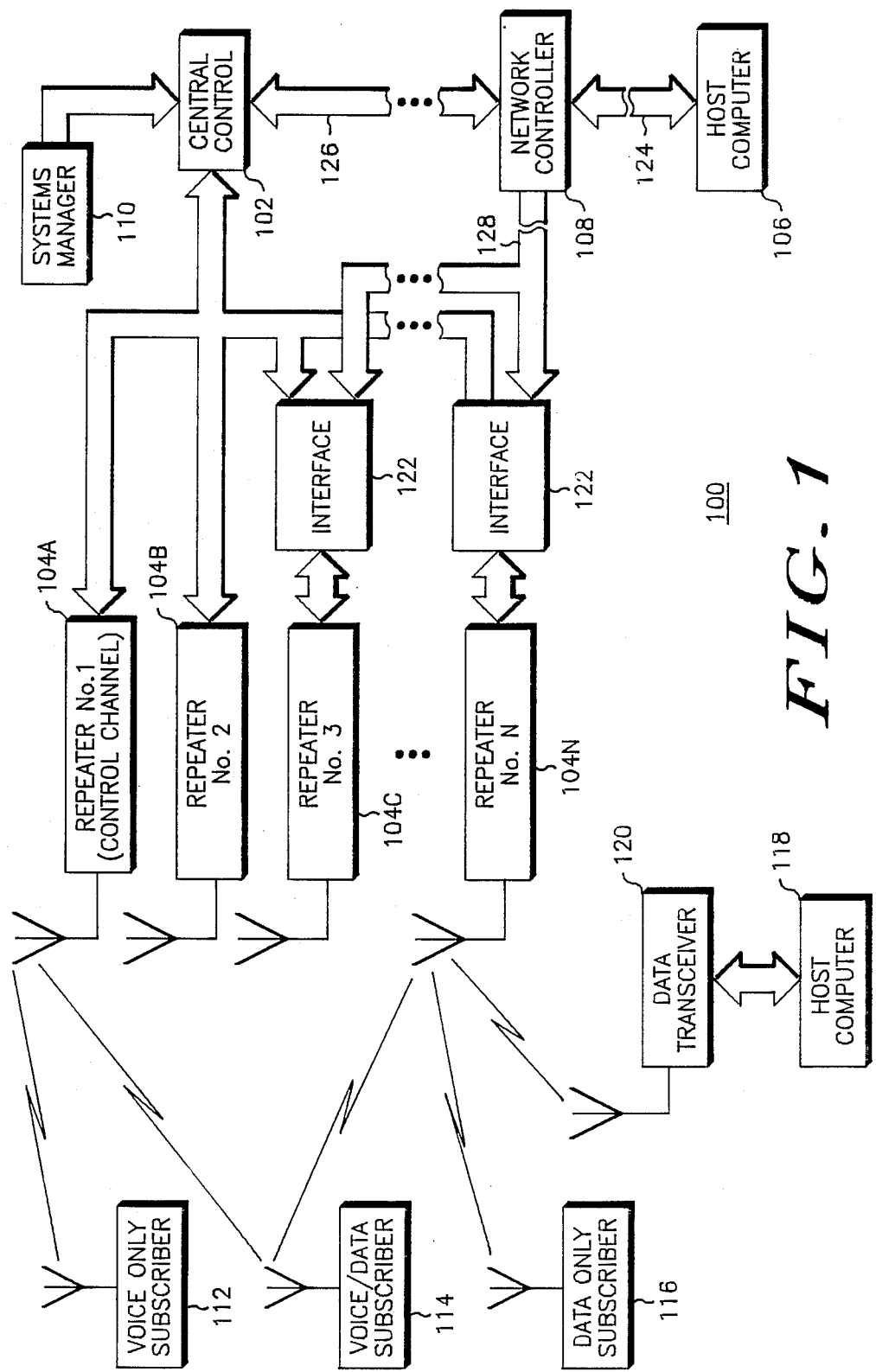
FIG. 1 is a block diagram of a trunked radio system that may employ the present invention.

Referring now to the drawings, and in particular to FIG. 1, there is shown a block diagram of a trunked voice/data communication system (100) that may employ the present invention. The centralized or fixed-end equipment comprises a central controller 102, which is responsible for allocating the channel resources (represented here by repeaters 104a–104N) amongst the many subscriber units. Of the available communication channels, one (repeater 104a) is selected to be a voice control channel, which communicates with any trunked subscriber capable of transmitting voice traffic.

Preferably, each of the repeaters 104a–N are capable of operating as a voice channel, control channel, or data channel. To accommodate data traffic, such repeaters are equipped with a data interface 122. The data interfaces 122 are responsible for encoding outbound data, decoding and error correcting inbound data, repeater control, and providing an interface between the repeater and the network controller 108. Alternately, a predetermined subset of the total number of repeaters may be equipped for data or used as a control channel. Typically, the particular repeater selected to be the control channel (104a) is periodically changed as a control measure.

The data network comprises at least one host computer 106, which is coupled (i.e., wireline) to a network controller 108. The network controller 108 is responsible for data traffic routing and communicating with the central controller 102 to request the allocation of a data channel. Those skilled in the art will appreciate that if the host computer 106, the network controller 108 and the central controller 102 are co-located, the intercouplings (124–128) may be direct. However, should remote locations be desired, such communications may be maintained through the use of data modems as is known in the art. Optionally, or additionally, the trunked voice/data communication system 100 may employ one or more radio frequency (RF) coupled host computers 118. The RF host 118 communicates as a trunked control station via any suitable data transceiver 120. The primary difference between the wireline host 106 and the RF host 118 is that the data subscribers communicate directly (i.e., via both the inbound and outbound frequencies of a data equipped repeater) with the RF host, whereas the wireline host 106 transceives all information via the inbound or outbound frequencies of a data equipped repeater. Accordingly, the data network of the present invention may employ several computers in either a centralized or distributed processing arrangement.

Generally, the fixed-end equipment also includes a system manager console 110 that enables the supervisor of a communication service provider to set a number of operational parameters that control the operation of the trunked communication system. Typical examples of such parameters include the maximum number of assignable data channels (if any), whether voice or data will be the priority traffic, and various threshold values that control when data channels may be added or reallocated to voice traffic. Thus, at any particular time, the trunked communication system of the present invention need not have any channels allocated for data traffic. Conversely, if voice traffic is low, or if data traffic enjoys a priority status or is particularly heavy, one or more channels may be allocated for data communication.

According to the present invention, a predetermined channel ordinarily comprises the first channel to be allocated for data. Preferably, this first assigned data channel (hereinafter "the master data channel") has the same frequency as any single frequency data-only subscribers (116) to provide maximum compatibility with existing data equipment. Alternately, a random channel may be the first assigned data channel; however, the data-only subscribers must scan the available channels to find it. Thus, the present invention prefers to first assign a selected channel, and, thereafter, assign any other data equipped (122) channel as an additional data channel.

The present invention allocates data channels for a time interval determined by either the system manager or a default parameter. The length of the allocation period may vary with the time of day, system loading or other such parameters. By reserving a channel for data use over a time period, data channel requests are minimized and spectral efficiency is maximized since a data subscriber need not request a data channel for each separate data transmission.

As a general principle, the goal of any trunked communication system is to effectively allocate the limited channel resources amongst a plurality of subscriber units. The present invention contemplates three classes of subscriber units: voice-only subscribers 112, voice/data subscribers 114, and data-only subscribers 116. The voice-only subscribers 112 are contemplated to be any existing trunked subscriber unit having a compatible signalling protocol to allow interaction with the system (100). The data-only subscribers (116) are contemplated to be any multiple or single channel data transceivers such as the KDT 800 ™, manufactured by Motorola, Inc., or functional equivalent. Of course, receive-only data devices, such as any of the Motorola family of display pagers, may also operate to receive paging data over an assigned data channel. In this way, the trunked system of the present invention accommodates existing equipment, while providing enhanced communication capabilities. Subscriber units are typically comprised of either mobile, portable or control stations. Typically, mobile units are understood to be transceivers designed to operate in a vehicle. A portable unit is typically understood to be a transceiving or receive-only device designed primarily to be carried on or about the person. Control stations are usually permanent or semi-permanent installations in buildings or other such fixed locations. These are collectively referred to herein as subscriber units, which communicate with one another through the fixed-end equipment.

As previously mentioned, the first data channel allocated is defined as the master data channel, the identity of which is periodically transmitted to all subscribers over the control channel. Additionally, or optionally, the identities of all other allocated data channels are periodically transmitted over both the voice control channel and the master data channel.

Those skilled in the art will appreciate that some criteria is required to decide how to distribute data users when multiple data channels are present. According to the present invention, the data subscribers (114 and 116) each determine their own assigned data channel by randomly selecting one of the available data channels.

It should also be understood that other bases are available and the particular basis used in any particular implementation is not critical to the practice of the present invention. Random number (selection) generators are well known in the art, and the particular algorithm used is not critical to the practice or understanding of the present inventive method. Of course, the particular data channel assignment will depend upon the actual number of data channels currently available. For example, a particular subscriber unit may select data channel one if the current number of data channels is two. If the number of channels is three, channel two may be selected, and so on. Of course, if there is only one data channel available, all data subscribers will use that channel. In this way, data subscribers may select a data channel and up-load or down-load information to or from the host computer 106 (or 118). As used herein, "up-load" means the transference of data or executable code from a subscriber unit to a host computer. The term "down-load" means the transference of data or executable code from a host computer to a subscriber unit.

When a particular number of data channels is assigned, the central 102 monitors the voice activity, while the network controller 108 monitors the activity on the data channels. This activity monitoring is preferably performed for a predetermined period of time. For example, the monitoring activity may be done by the hour (or half hour) so that during peak loading times the trunked system (100) can quickly adapt to reallocate the channel resources. If the network controller determines that the data activity on the assigned data channels has exceeded a predetermined supervisor selected threshold, the network controller 108 requests the central to allocate another channel for data traffic. Conversely, if the central determines that voice activity has exceeded a predetermined threshold, the central 102 requests the network controller to relinquish a data channel. In this way, the trunked system 100 adapts to reallocate the channel resources.

According to the present invention, reallocation begins by transmitting a "revert to master" command over all currently assigned data channels. When the subscriber units receive this command, they all revert to the master data channel to listen for new data channel assignments. The allocated data channels may be incremented or decremented by a predetermined number (one of the preferred embodiments) and the new allocation or number of data channels may be broadcast along with the identity of each data channel. The subscriber units receiving this information determine the number of available data channels and randomly select an assignment. In this way, the number of data channels can be conveniently incremented or decremented depending upon data traffic.

In addition to overall data traffic monitoring, the network controller 108 may determine that the data traffic load on a particular data channel is excessive. Accordingly, the present invention contemplates a method to balance the data traffic over the available data channels. Load leveling may be accomplished by simply transmitting a "revert to master" command over all currently assigned data channels. When the subscriber units receive this command, they all revert to the master data channel to listen for new data channel assignments. For load leveling, the actual number of allocated data channels may not have changed. The data subscribers are merely forced to randomly re-select a data channel assignment. However, it is possible that the data subscribers may not be able to effectively redistribute the data traffic using this simple approach. Accordingly, the present invention contemplates transmitting an offset "seed" to some or all the subscribers for the random selection algorithm. In this way, there is a statistical probability that the load will be spread over the available data channels as opposed to being congested onto a particular data channel. The data traffic may then be monitored over the next operating period, and if the load is still unbalanced a different offset seed may be transmitted to again redistribute the data load.

Those skilled in the art will appreciate that it is often desirable to communicate with all subscriber units at one time in response to either an emergency, or to distribute a message of general concern. For example, a message announcing some emergency condition, or that the host computer 106 (or 118) will be down for repair are examples of messages that would be convenient to transmit to all subscribers at one time. Accordingly, the present invention achieves this operation by transmitting the revert to master command over all allocated data channels. All subscribers respond to this command by listening to the master data channel. Just prior to retransmitting the current number of data channels and their identities (which may be unchanged), a system broadcast message is transmitted so that all subscribers may receive the message prior to receiving the data channel information. In this way rapid system wide data communication is provided by the present inventive method. After receiving the system message, the data subscribers may return to their assigned data channels.

Referring now to FIG. 2, an illustration of the preferred signalling format for the master data channel is shown. The signalling format 200 begins with a preamble portion 202, which may include synchronization or framing information for the data subscriber units. Following the preamble 202 is an optional block 204 wherein either a system message or an offset seed may be transmitted to effectuate either the system message operation or the load leveling procedure previously mentioned. Of course, during normal operations format block 204 would not be used and the preamble 202 would directly precede block 206.

Basically, block 206 transmits the total number of currently available data channels (be it 1, 2, 5, etc.) in any suitable form. Following block 206 are a plurality of blocks (208a through 208n) which transmit the identity of the data channels. In the preferred embodiment, the transmitted identity of the data channels is the actual frequency of the channels. Alternately, the channels could be assigned a designated number and the selected ones available for data use transmitted. For example, if a particular system has five channels, it may be convenient to label them 1–5. Then, assuming the subscribers knew the frequencies, the numbers "4" and "5" may be transmitted to indicate that channels four and five are the data channels. The preferred method, however, is to transmit the actual frequencies, since this allows for simple expansion of the system, and limits the amount of information required to reside in the subscriber units. Therefore, if there is one data channel (i.e., the master data channel), that frequency will be transmitted in block 208a. If there are five data channels currently available (the master data channel plus four other data channels), those frequencies may be transmitted (for example in blocks 208a through 208e), and so on.

After the transmission of the identity of the last available data channel, the master data channel may be used by the subscriber units as a data channel as is illustrated by block 210.

To effectuate a recovery process, in case any particular subscriber unit should temporarily lose its data channel assignment, the central 102 and the network controller 108 may periodically transmit the signalling format 200 over the voice control channel and the master data channel, respectively. If through some error the data channel assignment is lost, the present invention provides that all data mode subscriber units automatically revert to the master data channel. In this way, a subscriber unit may receive the periodic transmissions of the channel assignments from the master data channel and return to the proper data channel assignment. In the event a subscriber unit loses the identity of the master data channel, the present invention further provides that the subscriber units revert to the voice control channel to receive the data channel allocation information.

Referring now to FIG. 3, the preferred format for other (i.e., not the master) data channels is shown. Basically, the format of a data channel 300 begins with a preamble 302, which may include synchronization and framing information. The preamble 302 precedes a plurality of variable length data messages 304–308.

As previously mentioned, the request for assignment of a data channel is prohibitively long compared to the typical data message transmission time. Therefore, the present invention contemplates a subscriber unit going to its assigned data channel and transmitting the data information without re-requesting the channel. Operating in this manner conserves spectrum and speeds transmission by eliminating the requirement to request a data channel. Of course, there exists the possibility that there will be data collisions on the data channels. However, data collision avoidance mechanisms and methods are widely known in the art and any suitable data collision avoidance and recovery method will be suitable for use in the present invention.

As illustrated in FIG. 3, the lengths of data messages 1, 2 and 3 (304, 306 and 308), are all of a variable duration depending upon the amount of information to be transmitted. Thus, once a subscriber unit gains access to a data channel, the subscriber may transmit data for as long as required to complete a data message. Of course, a second subscriber unit attempting to transmit data may be required to wait until the first subscriber has completed transmitting. Thus, a data channel may be in constant or near constant use. During periods of high data channel use, the preamble portion 302 need not be transmitted since the subscribers may still be synchronized to the incoming data. However, if the data channel use is low, the network controller 108 or a data subscriber may transmit the preamble portion 302 prior to transmitting.

Figure 4:
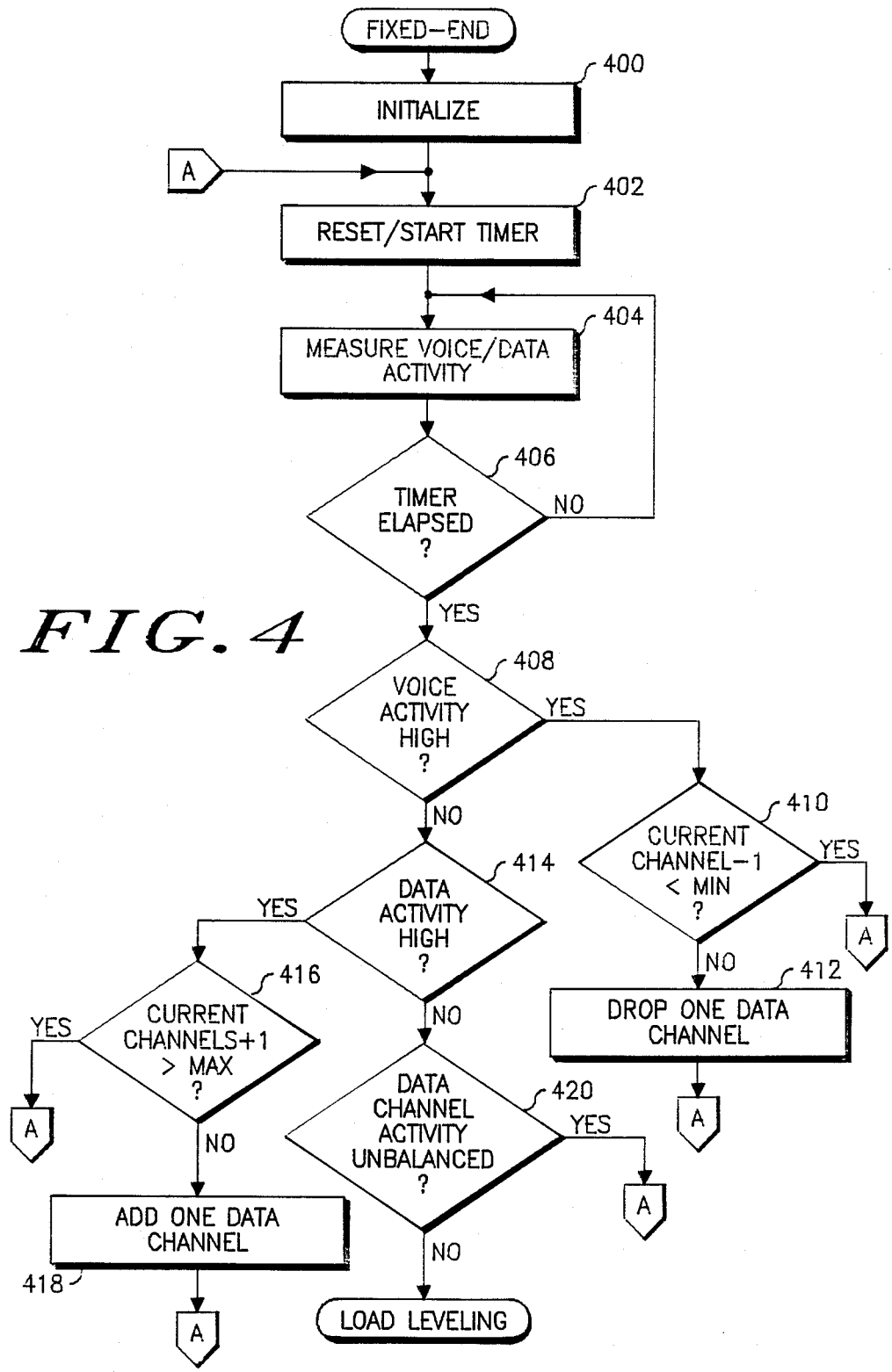
FIG. 4 is a flow diagram illustrating the steps executed by the fixed-end equipment of FIG. 1 in accordance with the present invention.

Referring now to FIG. 4, there is shown a flow diagram illustrating the steps executed by the fixed-end equipment to implement the present invention. The routine begins with initializing step 400, wherein the central controller 102 and the network controller 108 may set aside memory space or perform other such functions as any particular system may require. The routine next proceeds to step 402, which starts the period timer over which the central controller 102 monitors the voice activity and the network controller monitors the data activity. In step 404, these measurements are taken such as by calculating the air-time billing information or other such suitable means. Following step 404, decision 406 determines whether or not the timer has elapsed. If the timer has not elapsed, a loop is formed with step 404 until decision 406 determines that the timer has expired.

Decision 408 determines whether the voice activity is high when compared to a selected threshold that may be specified by the system supervisor. If the determination of decision 408 is that the voice activity is high, decision 410 determines whether the current number of data channels minus a predetermined offset (one in the preferred embodiment) would be less than the minimum number (if any) of data channels specified by the system supervisor. If so, decision 410 returns control to reference letter A, which resets the timer and the routine begins again. If, however, decision 410 determines that removing a channel would not be below the minimum allowed data channels, or there is no minimum, the routine proceeds to step 412, which de-allocates a channel from data traffic and returns it to voice traffic. The routine then proceeds to reference letter A of FIG. 4.

If the determination of decision 408 is that the voice activity is not high, the routine proceeds to decision 414, which determines whether the data activity is high compared to a predetermined threshold selected by the system supervisor. If the determination of decision 414 is that the data activity is high, the routine proceeds to decision 416, which determines whether the current number of channels plus one (in the preferred embodiment) is greater than the maximum number (if any) specified by the system supervisor. If the determination of decision 416 is that the additional channel would exceed the maximum, the routine returns control to reference letter A. If, however, decision 416 determines that the addition of a data channel will not exceed the maximum, the routine proceeds to step 418, which allocates an additional channel from voice traffic to data traffic. The routine then returns control to reference letter A of FIG. 4.

Additionally, the fixed-end equipment may take traffic priorities into account before the allocation step 418 and the de-allocation step 412. If, for example, a particular system favored voice traffic, an additional data channel may not be allocated if voice traffic were above a predetermined minimum. Alternately, for a system having a data traffic preference, a data channel may not be re-allocated for voice traffic if data traffic was above a predetermined threshold. In the absence of either a voice traffic or data traffic preference, the absolute allocation and de-allocation procedure of FIG. 4 is preferred.

Referring still to FIG. 4, if the determination of 414 is that the data activity as a whole is not high, the routine proceeds to decision 420 to determine whether the data traffic across all available data channels is balanced or unbalanced. If the determination of decision 420 is that the traffic is essentially balanced, the routine returns control to reference letter A, which resets the timer of step 402. If, however, decision 420 determines that the data traffic is unbalanced the routine proceeds to the load leveling routine of FIG. 5a.

Referring now to FIG. 5a, the steps executed by the network controller 108 to execute a load leveling of data traffic across the available data channels is described. The routine begins in step 500, which transmits a revert to master command across all data channels. Upon receipt of the command, the data subscribers relisten to the master data channel and may receive an offset seed parameter or a load level command transmitted as block 204 of FIG. 2 (502 of FIG. 5a). The load leveling routine next proceeds to step 504, where the number of available data channels and their identities are transmitted over the master data channel. Of course, the total number may not have changed; instead the offset seed parameter may have been added to statistically redistribute the groups (or subgroups) across the available data channels. After receiving this information, each subscriber randomly re-selects a data channel assignment. Of course, as previously mentioned, if after monitoring the next transmission period, the data traffic load remains unbalanced, a different offset seed may be transmitted until an acceptable balance is obtained between the data traffic and the available data channel resources.

Referring now to FIG. 5b, the steps executed by the network controller 108 to broadcast a system wide data message is shown. The routine begins in step 506, where the revert to master command is transmitted to all data subscribers. Next, in step 508, the system message is transmitted (see FIG. 2, block 204) to the subscriber units over the master data channel. Following step 508, the current number of data channels and their identities (which may be unchanged) are transmitted in step 510. In this way, a message of general concern may be rapidly and efficiently transmitted to all data subscriber units. Lastly, after step 510, the routine returns to reference letter A of FIG. 4.

Figure 6:
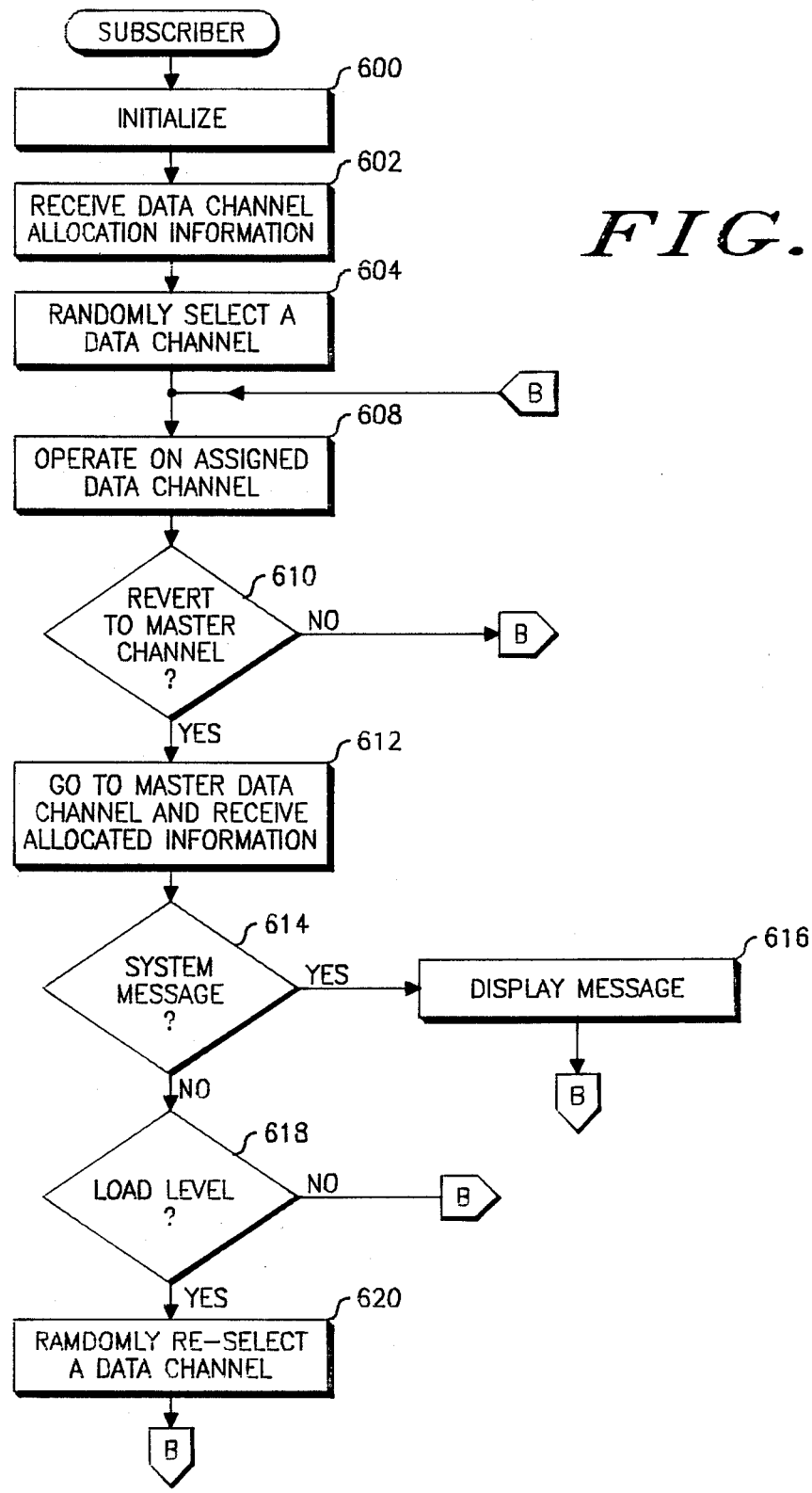
FIGS. 6a and 6b are flow diagrams illustrating the steps executed by the data subscribers of FIG. 1.

Referring now to FIGS. 6a and 6b, there are shown flow diagrams illustrating the steps executed by a data subscriber unit (114 or 116) in accordance with the present invention. In FIG. 6a, the routine begins in step 600, where the data subscriber performs any initialization steps required in any particular implementation. In step 602 the data subscriber receives the data channel allocation information from either the voice control channel or the master data channel. Additionally, a subscriber monitoring the master data channel may receive a system message (see FIG. 2). In step 604, the data subscriber randomly selects a data channel from the available data channels. In step 608, the data subscriber operates to receive and transmit data information on the assigned data channel. Decision 610 determines whether a "revert to master" command was received. If so, the subscriber goes to the master control channel to receive the data channel allocation information in step 612; otherwise, the routine returns to reference letter B to continue data operations.

Decision 614 determines whether the data allocation information contained a system message. If so, the data subscriber stores or plays back the message by any appropriate means. For example, the subscriber can display the message (step 616) on any suitable display means. Optionally, the data subscriber may generate a "hard copy" on a printer, or speech synthesis may be utilized to render the message audible. If the determination of decision 614 is that the data channel allocation information does not contain a system message, the routine proceeds to reference letter C of FIG. 6b.

Referring now to FIG. 6b, decision 618 determines whether the data channel allocation information contained a load leveling command or a new offset seed. If so, the data subscriber again randomly selects a data channel assignment 620, which may be different than its previous data channel assignment, and the routine proceeds to reference letter B wherein the subscriber returns to normal data communication.

While a particular embodiment of the invention has been described and shown, it should be understood that the invention is not limited thereto since many modifications may be made. It is therefore contemplated by the present application to cover any and all such modifications that may fall within the true spirit and scope of the basic underlying principles disclosed and claimed herein.

What is claimed is:

1. A method for allocating data channels on a trunked radio frequency communication system having a control channel and a plurality of channels available for voice or data communication and a plurality of data subscribers, comprising the steps of:
   (a) measuring the amount of data communications during a predetermined interval;
   (b) comparing said measured amount of data communications to a predetermined threshold;
   (c) changing the number of channels allocated for data communication in response to step (b); and
   (d) informing said plurality of data subscribers that the number of channels allocated for data communication has been changed.

2. The method of claim 1, which includes a method for leveling data traffic over at least two channels comprising the steps of:
   (a) measuring the amount of data communications over each of the channels allocated for data;
   (b) determining whether said measured amount of data communications is uniformly distributed over the channels allocated for data;
   (c) in response to step (b) causing all data subscribers to go to the control channel;
   (d) transmitting a random number to said data subscribers via said control channel.

3. The method of claim 2, which includes the step of:
   (e) commanding the plurality of data subscribers to randomly re-select a data channel based at least in part on said random number.

4. The method of claim 3, wherein the step of measuring comprises calculating the amount of data communications based at least in part on subscriber air-time billing information.

5. The method of claim 4, wherein the step of changing comprises increasing the number of channels allocated for data by a predetermined number of channels.

6. The method of claim 5, wherein said channels allocated for data are increased by one.

7. The method of claim 6, wherein the step of changing comprises decreasing the number of channels allocated for data by a predetermined number of channels.

8. The method of claim 7, wherein said channels allocated for data are decreased by one.

9. In a trunked radio frequency communication system having a plurality of data subscribers, a plurality of data channels, and a control channel, a method for leveling data traffic over said plurality of data channels, comprising the steps of:
   (a) measuring the amount of data traffic on each of said plurality of data channels;
   (b) determining whether said measured amount of data traffic is uniformly distributed;
   (c) in response to step (b) causing said data subscribers to go to said control channel; and (d) transmitting a random number to said data subscribers via said control channel.

10. The method of claim 9, which includes the step of:
    (e) causing said plurality of data subscribers to randomly re-select a data channel assignment based at least in part on said random number.

11. A method for communicating on a trunked communication system having a plurality of data subscriber units and at least one central controller and network controller to allocate a plurality of channels for data or voice traffic, comprising the steps of:

at the network controller:
  (a) measuring data traffic over the channels allocated for data;
  (b) comparing said measured data traffic to a predetermined threshold;
  (c) transmitting a data channel request to the central controller as necessary in response to step (b):
  (d) transmitting a command signal to the plurality of data subscriber units over a predetermined channel;
  (e) transmitting an information signal to the plurality of data subscriber units over a predetermined channel;

at the central controller:
  (a) receiving said data channel request from the network controller;
  (b) varying the number of allocated data channels in response to said data channel request;
  (c) transmitting an information signal to the plurality of subscriber units over a control channel;

at the plurality of data subscriber units;
  (a) receiving said command signal;
  (b) receiving said information signal from said network controller;
  (c) randomly selecting a data channel in response to said information signal from said network controller;
  (d) monitoring said selected channel.

12. The method of claim 11, which includes the central controller step of transmitting, periodically, the identity of a first allocated data channel over said control channel.

13. The method of claim 11, which includes the central controller step of transmitting the identity of all available data channels over said control channel.

14. The method of claim 12, which includes the network controller step of transmitting the identity of all available data channels over said first allocated channel.

* * * * *